United States Patent
Lee

(12) 
(10) Patent No.: US 7,131,231 B1
(45) Date of Patent: Nov. 7, 2006

(54) MULTI-FUNCTION ELECTRONIC FISHING FLOAT

(75) Inventor: Won Do Lee, Busan (KR)

(73) Assignee: Wondohitech Co., Ltd., Busan (KR)

( * ) Notice: Subject to any disclaimer, the term of this patent is extended or adjusted under 35 U.S.C. 154(b) by 0 days.

(21) Appl. No.: 11/204,090

(22) Filed: Aug. 16, 2005

(30) Foreign Application Priority Data

Jul. 4, 2005 (KR) ...................... 10-2005-0059766

(51) Int. Cl.
*A01K 97/12* (2006.01)

(52) U.S. Cl. .......................................... 43/17; 43/17.5

(58) Field of Classification Search ............... 43/4, 43/16, 17, 17.1, 17.5, 17.6; 340/573.2
See application file for complete search history.

(56) References Cited

U.S. PATENT DOCUMENTS

| | | | | |
|---|---|---|---|---|
| 3,382,598 A * | 5/1968 | Wilson | ......................... | 43/17 |
| 4,437,255 A * | 3/1984 | Reed | ......................... | 43/17 |
| 4,748,760 A * | 6/1988 | Widmer | ......................... | 43/17 |
| 4,890,334 A * | 12/1989 | Chien | ......................... | 43/16 |
| 5,005,309 A * | 4/1991 | Hall | ......................... | 43/4 |
| 5,052,145 A * | 10/1991 | Wang | ......................... | 43/17.5 |
| 5,351,431 A * | 10/1994 | Ryu | ......................... | 43/17 |
| 5,463,597 A * | 10/1995 | Harley | ......................... | 367/107 |
| 5,511,335 A * | 4/1996 | Langer | ......................... | 43/4 |
| 5,581,930 A * | 12/1996 | Langer | ......................... | 43/17 |
| 5,782,033 A * | 7/1998 | Park et al. | ......................... | 43/4 |
| 5,937,566 A * | 8/1999 | Buczkowski et al. | ......................... | 43/17.5 |
| 6,138,398 A * | 10/2000 | Livingston | ......................... | 43/17 |
| 6,222,449 B1 * | 4/2001 | Twining | ......................... | 340/539.11 |
| 6,397,510 B1 * | 6/2002 | Klein | ......................... | 43/17 |
| 6,584,722 B1 * | 7/2003 | Walls et al. | ......................... | 43/4 |
| 6,671,994 B1 * | 1/2004 | Klein | ......................... | 43/17 |
| 6,724,688 B1 * | 4/2004 | Betts et al. | ......................... | 367/99 |
| 6,758,006 B1 * | 7/2004 | Walls et al. | ......................... | 43/4.5 |
| 6,771,562 B1 * | 8/2004 | Betts et al. | ......................... | 367/111 |

* cited by examiner

*Primary Examiner*—Darren W. Ark
*Assistant Examiner*—John D. Holman
(74) *Attorney, Agent, or Firm*—Birch, Stewart, Kolasch & Birch, LLP

(57) ABSTRACT

A multi-function electronic fishing float having an identification number automatically generates radio frequency (RF) signals, if a fish takes bait or is hooked. The generated RF signal is sent to a receiver, and an angler can clearly identify a sign of a fish's bite or hooking through sound, vibration, or light generated by the receiver, without checking the float with eyes.

A transmitter sending RF signals corresponding to the fish's bite or hooking is installed in the electronic fishing float that partially comes up above the water surface by buoyancy, and the transmitted RF signals are received by the receiver outputting sound, vibration, and light as information on the fish's bite or hooking.

5 Claims, 9 Drawing Sheets

MULTI-FUNCTION ELECTRONIC FISHING FLOAT

BACKGROUND OF THE INVENTION

1. Field of the Invention

The present invention relates to a fishing float and, more particularly, to a multi-function electronic fishing float having an identification number and enabling easy identification of a fish's bite by utilizing radio frequency (RF) communication and signals (sound, vibration, or light).

The multi-function electronic fishing float automatically generates RF signals, and the generated RF signals are sent to a receiver, when a fish takes bait or is hooked.

Additionally, a multi-function electronic fishing float according to the present invention helps an angler clearly identify a bite or hooking of a fish with signals of light, vibration, or sounds (voice or various sounds of music) output from the receiver, even without watching the fishing float continuously.

Additionally, the present invention relates to a multi-function electronic fishing float that minimizes changes of an angler's location when the fishing float is used in flowing water by forming rotating blades at the submerged part of the electronic fishing float.

2. Description of the Prior Art

Generally, basic fishing tackles such as a fishing rod, line, hook, float, and bait are required for fishing.

Presently, various types of fishing floats are being used. The fishing floats are generally formed of materials such as rigid synthetic resin or wood, having an air pocket formed therein to provide buoyancy.

Among such fishing tackles, the fishing float is used to identify a bite or hooking of a fish in water and, particularly, a proper fishing float is used according to the depth of the water.

The fishing float maintains a state that its upper part comes up above the water surface, and moves upwards/downwards in response to the fish's bite. Accordingly, an angler may consider a correct time of pulling a fishing rod and decide whether to pull the fishing rod or not.

However, in the case of fishing with a conventional fishing float, the fishing float with its upper part coming up above the water surface easily moves due to waves generated by wind or flowing water. Therefore, an angler faces difficulties in identifying whether the movement of the float is caused by the fish's bite or by the waves.

Accordingly, there may be a problem of missing a fish, because a fishing rod is not pulled at a correct time in response to the fish's bite, and pulling the fishing rod is not instantly performed.

Additionally, an angler has to watch the float continuously during the fishing. If the fishing is continued for a long time, the angler may face problems of feeling stress and fatigue due to strain in eyes, bloodshot eyes, or losing its eyesight in the worst case.

SUMMARY OF THE INVENTION

The present invention is to solve the problems and disadvantages in the prior art described above.

An object of the present invention is to provide an electronic fishing float transmitting signals of electronic radio frequency (RF) communication, and having a piston equipped with a spring to prevent wrong information caused by waves, so that time of fish hooking is correctly decided by identifying a bite and hooking of a fish.

Another object of the present invention is to provide signals of the bite or hooking for an angler, even without watching the fishing float continuously, by sending the signals transmitted by the electronic fishing float to the angler through a receiver.

Another object of the present invention is to provide a multi-function electronic fishing float of a new type that transmits a signal of hook time more clearly and easily according to the fish's bite, so that an angler may get information on the bite and hooking of the fish with signals such as sound, vibration, or light transmitted by the electronic fishing float.

Another object of the present invention is to enable comfortable and efficient fishing even in flowing water, namely, in the environment of flowing water having flow velocity, by preventing the electronic fishing float from being carried away by the flowing water and maintaining a predetermined an angler's location.

Additionally, a receiver according to the present invention may include various functions such as contents of fishing or mountaineering, navigator, voice recorder, storage for digital photo album, digital camera, DMB television, automatic measurement of a distance to a putting hole in a golf course, and electronic pocketbook. Therefore, everybody regardless of age and sex may enjoy happy fishing and leisure activities.

In order to achieve the above objects, an electronic fishing float according to the present invention includes a main body having a first screw and a second screw formed respectively at its top and bottom parts, a platform formed therein, and accommodation holes formed on the platform, and a slip groove formed along its outer circumferential surface. An upper cap is formed as a dome and having a screw formed on the inner circumferential surface.

Additionally, an electronic fishing float according to the present invention includes a lower cap in a cylinder form having a plurality of upper protrusions radially disposed on the inner circumferential surface at its upper part, a plurality of openings and rotating blades disposed on its outer circumferential surface at the same intervals; a piston having a coil spring installed therein; a piston formed with a predetermined length and having a connection hole formed at its lower part, and fixed to a magnet in a stepped form; a transmitter generating a predefined RF signals; a receiver receiving the RF signals generated by the transmitter, and monitoring sound or voice, vibration, light, and the RF signal.

As described above, an electronic fishing float according to the present invention has functions of detecting signals of a fish's bite or hooking with a first, second, and third lead switches installed on the transmitter of the electronic fishing float, by applying the detected signals to a transmittance controller, and by sending RF signals generated by the transmittance controller through a RF communication module.

The receiver includes a RF receiving module to receive the transmitted RF signal; a central processing unit having a memory for saving transmission/reception data and input data; an operating module for outputting sound, vibration, and light signals according to the received RF signals; a monitor displaying a state of a fish's bite or hooking; an audio module generating sound and music; a FM tuner; a USB port being connected to a personal computer; a keypad, and a power supply.

The central processing unit further includes a flash memory for saving permanent or temporary data.

DETAILED DESCRIPTION OF THE PREFERRED EMBODIMENTS

Figure 1:
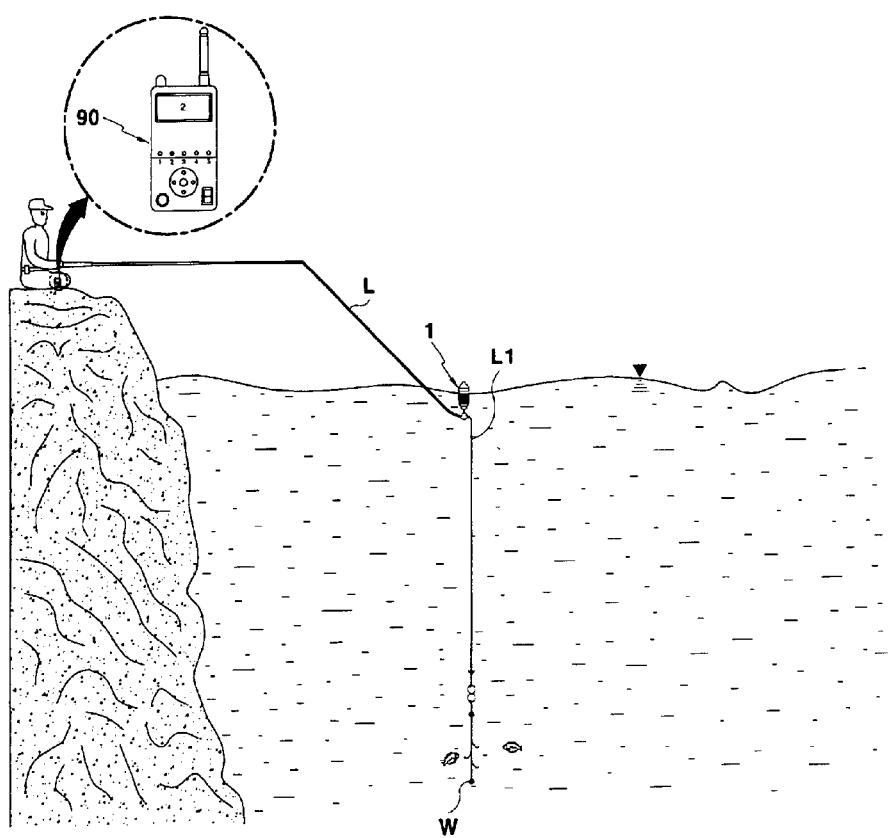
FIG. 1 is a schematic view showing a configuration of a multi-function electronic fishing float according to the present invention.

Hereinafter, the present invention will be described in more detail with reference to the accompanying drawings.

As shown in FIG. 1 to FIG. 5, a multi-function electronic fishing float 1 according to the present invention includes a main body 10, an upper cap 20, a lower cap 30, a locking cap 40, a piston 50, a transmitter 60, a fishing line brake 70, a bottom cap 80, and a receiver 90.

The main body 10 has a platform 11 formed with a step 11' on its upper surface, accommodation holes 12 formed piercing the platform 11 along the circumference of the main body 10, a first screw 14 and a second screw 15 respectively formed on the outer circumferential surface of the top and bottom parts of the main body 10, a slip groove 18 formed at the middle part around the outer circumferential surface of the main body 10, a connecting rod 16 protruding vertically from the upper surface of the platform 11, and a female screw 17 formed on the inner circumferential surface of the main body 10.

The upper cap 20 is formed as a dome, and has a screw on its inner circumferential surface.

The lower cap 30 is formed as a cylinder, and has a plurality of openings 31 and rotating blades 32 disposed radially at the same intervals on its outer circumferential surface, a plurality of upper protrusions 33 radially formed on its inner circumferential surface, and a plurality of lower protrusions 34 formed at its bottom part.

The locking cap 40 has a handle 41 on its upper surface and a male screw 42 formed on its outer circumferential surface.

The piston 50 is formed with a predetermined height, and has a magnet 51 assembled in a stepped form and a connection hole 53 formed at its lower part. The piston 50 is then inserted into a coil spring 52.

The transmitter 60 is equipped with a printed circuit board 61 having a battery 63, terminals 62, a first lead witch 65, a second lead switch 66, and a third lead switch 7. The transmitter 60 is assembled with the platform 11.

The fishing line brake 70 has a first cover 71 and a second cover 72 assembled together by a hooking method, a hole 73 having a predetermined length and formed on its upper part, a spring 74 and a fixing pin 75 assembled together to provide repulsive force, a guide channel 76 through which a main fishing line passes, a disc 78 rotatively assembled with a hinged shaft 77 in the guide channel 76, and a rubber pad 79 installed for braking the disc 78.

The bottom cap 80 is assembled with the bottom part of the main body 10.

Additionally, an upper watertight packing 23 is inserted between the main body 10 and the upper cap 20, and a lower watertight packing 53' is fixed to the step 11' in the main body 10.

The receiver 90 receives predetermined RF signals generated by a printed circuit board (PCB) 61 of the transmitter 60, and monitors sound or voice, vibration, light, and the RF signals.

Figure 2:
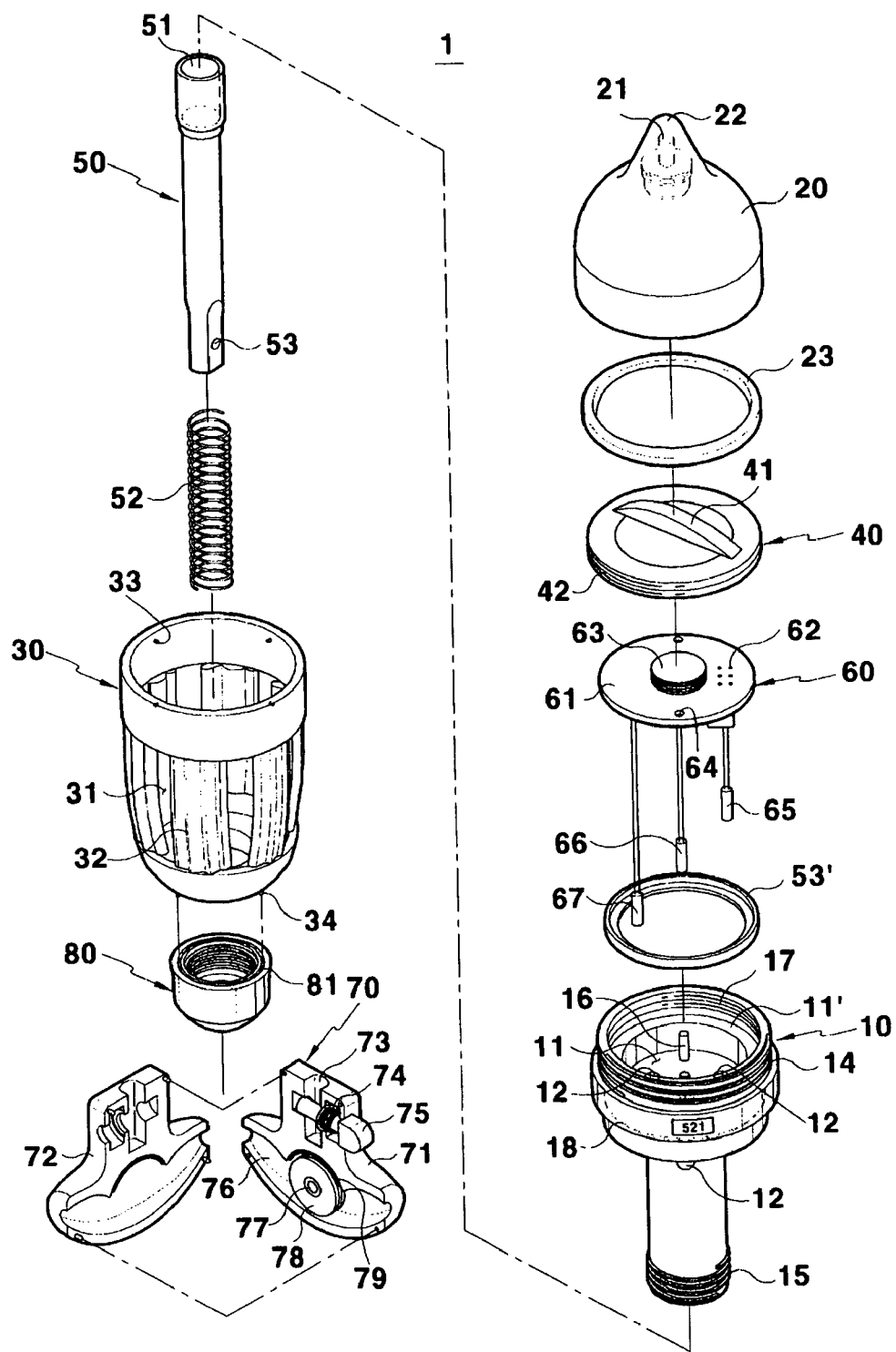
FIG. 2 is an exploded perspective view of a multi-function electronic fishing float according to the present invention.
Figure 3:
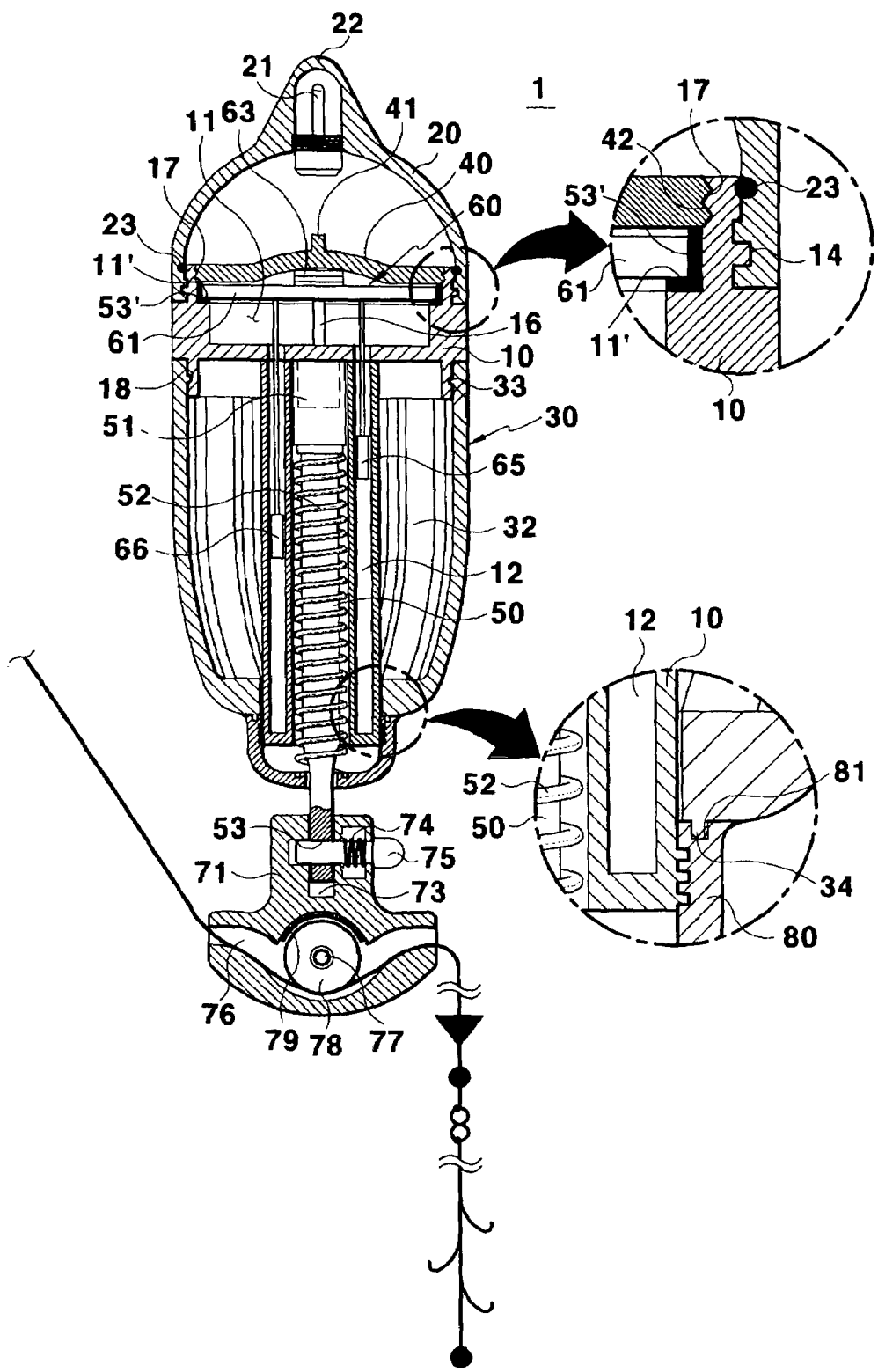
FIG. 3 is a vertical sectional view of a multi-function electronic fishing float according to the present invention.

FIG. 1 is a schematic view showing configuration of a multi-function electronic fishing float according to the present invention; FIG. 2 is an exploded perspective view of a multi-function electronic fishing float according to the present invention; and FIG. 3 is a vertical sectional view of a multi-function electronic fishing float according to the present invention.

The transmitter 60 is assembled with the step 11' of the platform 11 in the main body 10, and is sealed by the lower watertight packing 53' and locking cap 40. The upper cap 20 is assembled with the first screw 14, and the piston 50 is assembled from the bottom side by the lower cap 30.

As the connecting rods 16 protrudes from the upper surface of the platform 11 in the main body 10 and holes 64 are formed on the PCB 61, the connecting rods 16 are fixed by inserting them into the holes 64.

The first lead switch 65, second lead switch 66, and third lead switch 67 are located in the accommodation holes 12 formed in the main body 10. The main body 10 and the upper cap 20 are assembled together by a screwing method, and the upper watertight packing 23 is inserted therebetween.

The first lead switch 65, second lead switch 66, and third lead switch 67 have individually different lengths, and are located at different positions.

The piston 50 formed as a step is assembled with the magnet 51, and is inserted into the coil spring 52 to have repulsive force.

The main body 10 and the lower cap 30 are rotatively assembled together by the slip groove 18 and the upper protrusions 33, and the bottom cap 80 is assembled with the bottom part of the main body 10.

As the lower protrusions 34 are formed at the lower part of the lower cap 30 and the protrusion fitting groove 81 is formed at the upper part of the bottom cap 80, the lower protrusions 34 of the lower cap 30 are fitted into the protrusion fitting groove 81 of the bottom cap 80, and rotates freely along the protrusion fitting groove 81. Accordingly, the upper protrusions 33 are also rotatively guided along the slip groove 18 after assembling the bottom cap 80 with the main body 10.

The lower end of the coil spring 52, in which the piston 50 is inserted, is fixed by the bottom cap 80, and the fishing line brake 70 guiding a main fishing line L connected to a fishing rod is assembled with the connection hole 53 formed at the lower part of the piston 50.

The fishing line brake 70 is assembled with the spring 74 having repulsive force by the fixing pin 75. The disc 78 is rotatively assembled by the hinged shaft 77 in the guide channel 76 through which the main fishing line L passes, and is braked by the rubber pad 79.

The disc 78 is assembled to freely move within a predetermined gap, and its lower circumferential surface is continuously in contact with the main fishing line L passing through the guide channel 76.

Figure 4:
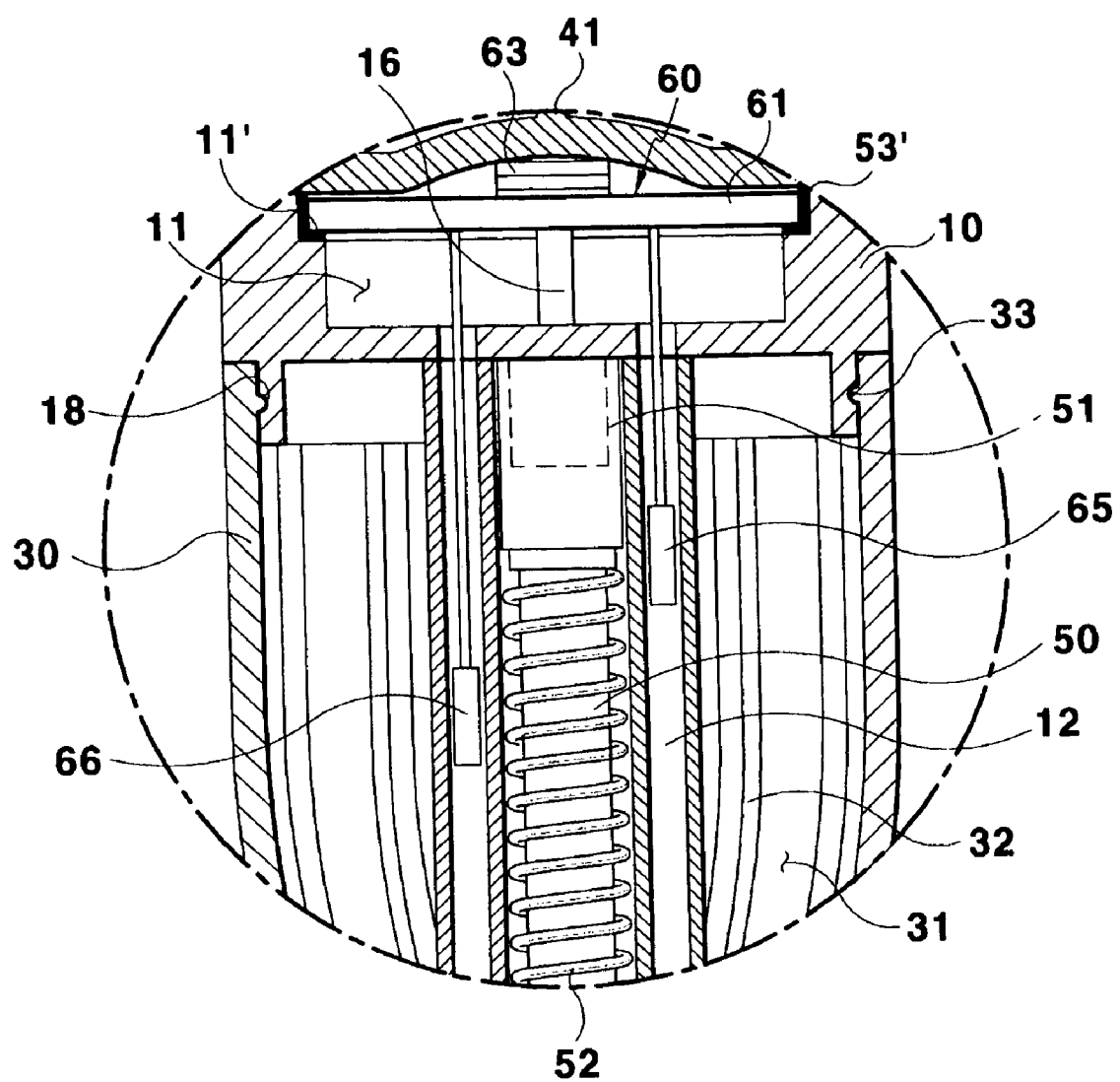
FIG. 4 is an enlarged partial sectional view showing a part of the multi-function electronic fishing float of FIG. 3 according to the present invention.

FIG. 4 is an enlarged partial sectional view showing a part of the multi-function electronic fishing float of FIG. 3 according to the present invention. The piston 50 moves downwards in response to a fish's bite or hooking, and moves to different positions according to the intensity of the bite or hooking. The position of the magnet 51 is detected by the first lead switch 65, second lead switch 66, and third lead switch 67, and thereby different signals are generated according to the intensity of the bite or hooking.

The displacement of the piston 50 varies according to the intensity of the fish's bite. The magnet 51 connected to the piston 50 moves a little and the signal of the fish's bite is detected by the first lead switch 65, in the case of a weak bite.

The magnet 51 moves further and a signal of the fish's bite is detected by the second lead switch 66, in the case of a strong bite. The piston moves to the lowermost position and a signal of hooking is detected by the third lead switch 67, in the case that the fish is hooked.

The piston 50 moved downwards by the fish's bite or hooking is returned to its initial position by repulsive force of the coil spring 52.

Various coil springs 52 having different repulsive forces may be used according to the kinds or sizes of fishes, or according to the fishing environment (freshwater or seawater). A coil spring 52 with a low repulsive force is used for a weak bite, and another coil spring with a high repulsive force is used for a strong bite. For example, coil springs are marked as 52-1, 52-2, 52-3, 52-4, 52-5, 52-6, 52-7, 52-8, 52-9, and so on according to the repulsive force of the spring, and may be replaced according to the situation of fishing. Therefore, correct bite and hooking signals are obtained.

Figure 5:
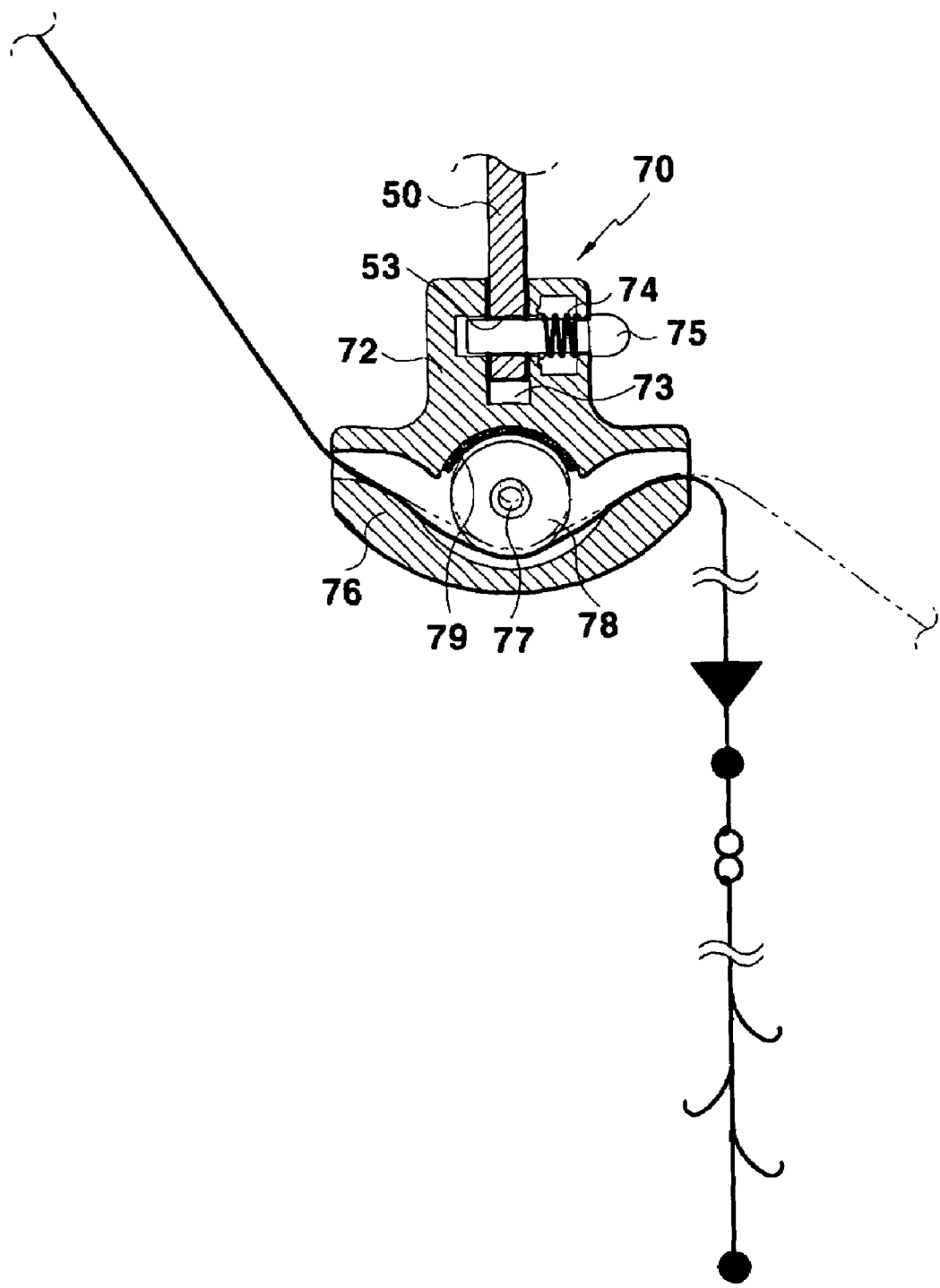
FIG. 5 is a vertical sectional view showing a fishing line brake of the multi-function electronic fishing float of FIG. 3 according to the present invention.

FIG. 5 is a vertical sectional view showing a fishing line brake of a multi-function electronic fishing float according to the present invention. The fishing line brake 70 includes a first cover 71 and a second cover 72 assembled together by a hooking method.

The fixing pin 75 is assembled with the spring 74 to have repulsive force in the hole 73 formed at the upper part of the first cover 71. The hinged shaft 77 horizontally protrudes towards the center of the guide channel 76 formed in the first cover 71. The disc 78 is assembled with the hinged shaft 77, and the rubber pad 79 is assembled above the disc 78, maintaining a predetermined distance.

The disc 78 is assembled with the hinged shaft 77, having a small allowance gap, and is thereby movable upwards and downwards. Accordingly, instantaneous braking of the disc 78 and fast signal transmission are performed due to the allowance gap between the disc 78 and the hinged shaft 77 in addition to the distance between the disc 78 and the rubber pad 79.

Figure 6:
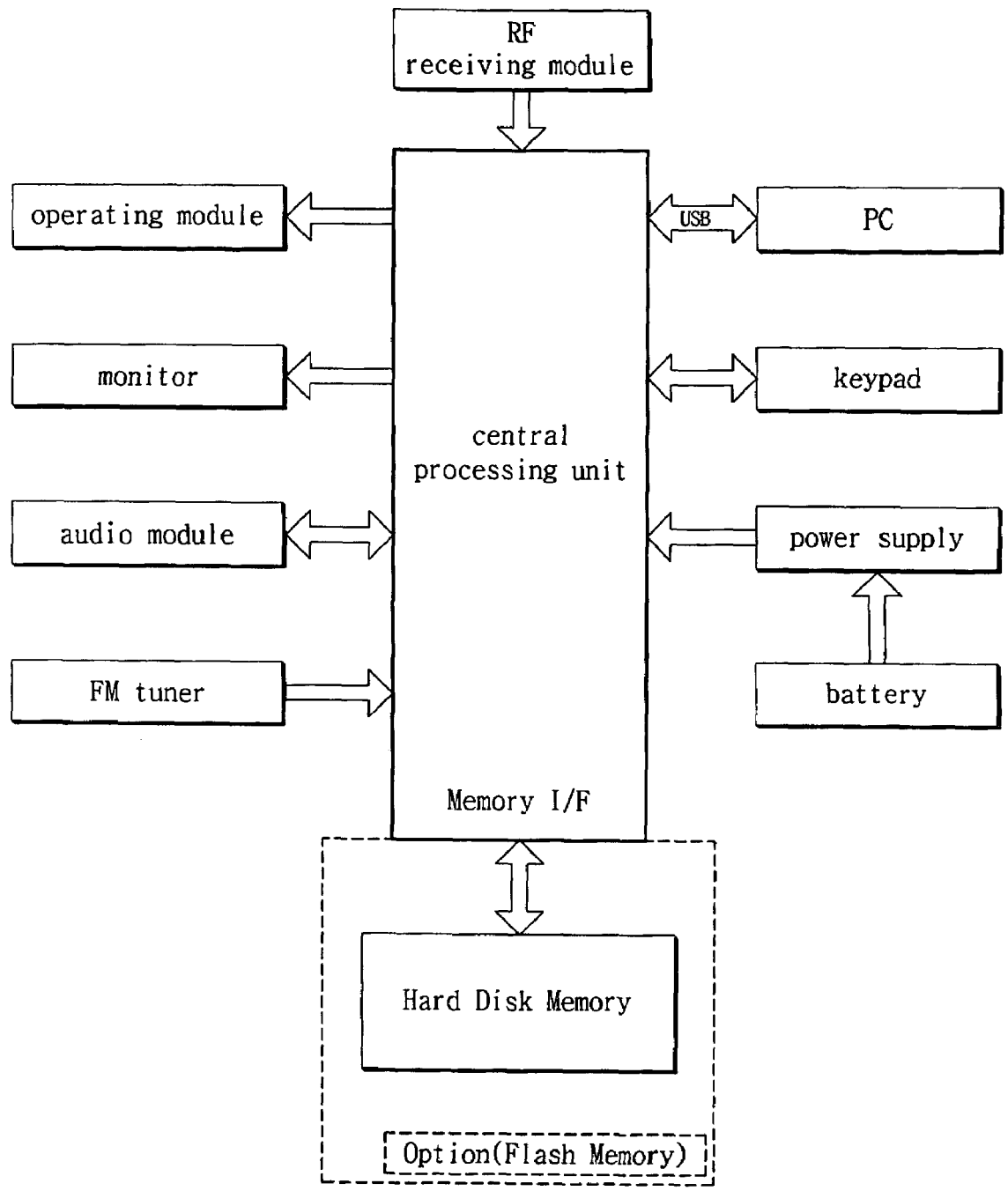
FIG. 6 is a block diagram showing a receiver of a multi-function electronic fishing float according to the present invention.
Figure 7:
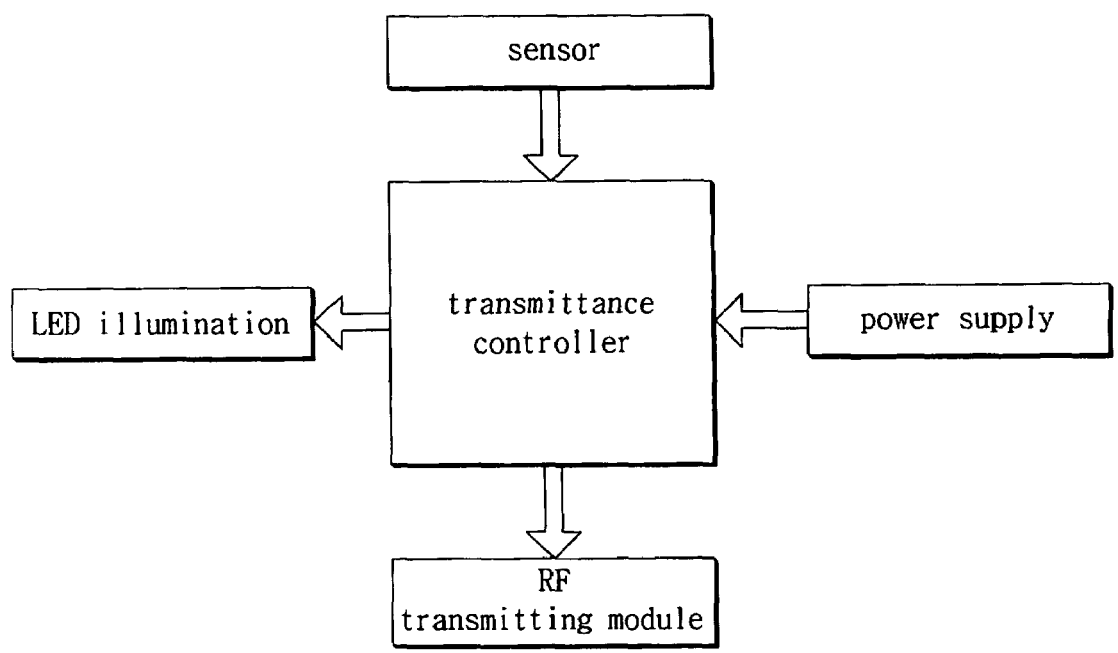
FIG. 7 is a block diagram showing a transmitter of a multi-function electronic fishing float according to the present invention.
Figure 8:
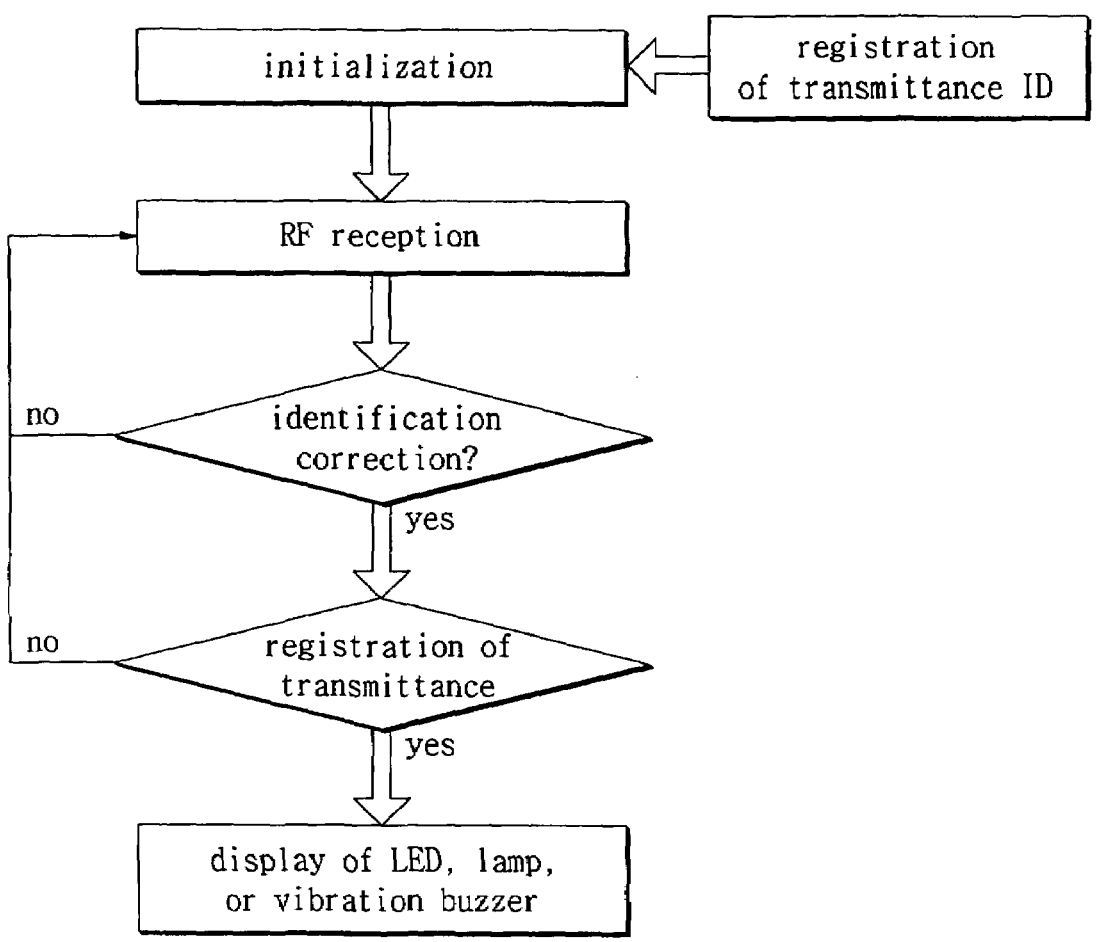
FIG. 8 is a flow chart showing RF reception of a multi-function electronic fishing float according to the present invention.

FIG. 6 is a block diagram showing a receiver of a multi-function electronic fishing float according to the present invention; FIG. 7 is a block diagram showing a transmitter of a multi-function electronic fishing float according to the present invention; and FIG. 8 is a flow chart showing RF reception of a multi-function electronic fishing float according to the present invention. In the transmitter installed in the electronic fishing float 1, a fish's bite or hooking is detected by the first, second, and third lead switches, and is applied to a transmittance controller. The transmittance controller illuminates light emitting diodes (LEDs) of an operating module and sends RF signals through a RF module.

The LEDs of the operating module includes a flickering lamp displaying the signal of the fish's bite or hooking, and an illumination lamp indicating the position of the electronic fishing float at night.

The receiver includes: a radio frequency receiving module to receive radio frequency (RF) signals sent by the transmitter; a central processing unit having a memory to save transmittance/reception data; an operating module to output a sound, vibration, or light signal in response to the received RF signals; a monitor displaying a state of a fish's bite or hooking, and geographical information with a content function; an audio module generating sound or voice; a frequency modulation (FM) tuner; a USB port being connected to a personal computer; a keypad having functions of DMB TV, fairway map in a golf course, measurement of a putting distance, and electronic pocketbook; and a power supply.

The central processing unit further includes a flash memory for saving permanent or temporary data.

Figure 9:
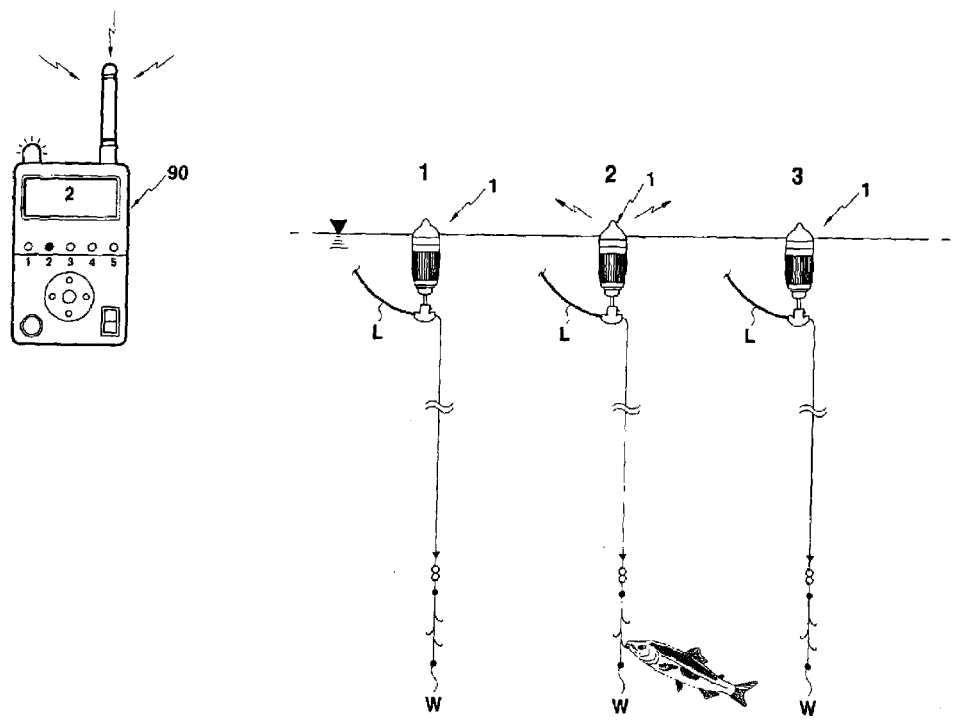
FIG. 9 is a schematic view showing an operating state of a multi-function electronic fishing float according to the present invention.

FIG. 9 is a schematic view showing an operating state of a multi-function electronic fishing float according to the present invention. One receiver 90 may communicate with a plurality of electronic fishing floats 1. Information on individual electronic fishing floats 1, namely, information on a fish's bite or hooking is sent to a receiver 90, and is displayed on a monitor.

An intrinsic identification number is assigned to each electronic fishing float 1, and signals of the fish's bite are sent to the receiver 90, and are displayed as sound, vibration, or light in response to the signals of the fish's bite, when a fish takes bait.

Hereinafter, operating mechanism of the electronic fishing transmitter/receiver according to an exemplary embodiment of the present invention will be described in detail.

As shown in FIG. 1 to FIG. 9, an electronic fishing float 1 includes a transmitter 60 detecting signals of a fish's bite or hooking and transmitting RF signals, and a receiver receiving the RF signals and displaying sound, vibration and light. An angler may enjoy intelligent fishing with the electronic fishing float 1 equipped with a digital system.

In order to use the electronic fishing float 1 according to the present invention, the electronic fishing float 1 having buoyancy is assembled in the following steps.

Firstly, a transmitter 60 is installed in a main body 10, and is sealed by assembling an upper cap 20. A piston 50 is assembled with a coil spring 52 to provide repulsive force, and a lower cap 30 and a bottom cap 80 are then sequentially assembled.

The upper cap 20 is formed of semitransparent synthetic resin, and an empty space is formed in the upper cap 20 to provide buoyancy.

A first lead switch 65, second lead switch 66, and third lead switch 67 of the transmitter 60 installed in the main body 10 are inserted into accommodation holes 12 so that they are individually located at predetermined different positions, and a magnet 51 is connected to the piston 50 having repulsive force by the coil spring 52.

The magnet 51 and lead switches 65, 66, and 67 are installed at adjacent positions each other, and the position of the piston 50 is detected by the lead switches 65, 66, and 67 with the help of magnetic fields generated by the magnet 51.

RF signals are generated according to the signals detected by the lead switches 65, 66, and 67, namely, signals of fish's bites are detected as the displacement of the piston 50.

A submerging weight W in a bead shape is connected to a main fishing line L, and the weight W is made of ceramic, plastic or a non-metal material, having high specific gravity and not causing environmental contamination.

In this way, an angler may enjoy fishing with the electronic fishing float 1 having the built-in transmitter 60 and the receiver 90.

The transmitter 60 according to the present invention is installed in the main body 10 partially coming up above the water surface. The transmitter 60 detects the position of the piston 50 in response to the fish's bite with the lead switches 65, 66, and 67, and generates RF signals.

A specific number indicated on the outer surface of the main body 10, namely, an identification number is inputted through terminals of the transmitter 60, and the inputted specific number is saved in the receiver 90. The receiver 90 receives the RF signals generated by the transmitter 60, and outputs information of the fish's bite and hooking as sound, vibration, or light.

As the lower cap 30 is rotatively assembled with the main body 10 of the electronic fishing float 1 by a slip groove 18 and upper protrusions 33, the carrying-away speed of the electronic fishing float 1 is relatively low. Therefore, the electronic fishing float 1 is suitable for fishing in flowing water or tide and current.

The lower cap 30 is rotated by an external force of flowing water applied to rotating blades 32, and becomes to have propulsive force against the flowing water. Accordingly, the electronic fishing float is carried away in a low speed, and is suitable for maintaining an angler's location.

The transmitter 60 according to the present invention utilizes a VHF, UHF, AM, or FM communication method for the transmittance of RF signals within the communication distance of 50 meters, and a plurality of identification numbers for each electronic fishing float may be created as serial numbers.

Additionally, the electronic fishing float 1 is required to be replaced according to the fishing environment such as the fishing place, and the kinds of fishes. If a fixing pin 75 of a fishing line brake 70 is pulled out sideward, the fixing pin 75 piercing a connection hole 53 of the piston 50 is released. Accordingly, the fishing line brake 70 is disassembled from the piston 50, and the electronic fishing float 1 may be simply replaced.

An electronic fishing float 1 according to the present invention may be simply replaced by disassembling the fishing line brake 70, and the piston 50 connected to the fishing line brake moves upwards/downwards and rotates freely.

Accordingly, the electronic fishing float 1 may be replaced fast, correctly, simply, and easily, and prevents the main fishing line L from entanglement or twist.

The main fishing line is guided through the fishing line brake 70, and a weight W in a bead shape is connected to the main fishing line L passing through the fishing line brake 70. The weight W is made of ceramic, plastic, or a non-metal material having high specific gravity, and is thereby free from the problems of environmental contamination due to heavy metals such as lead.

The receiver 90 of the electronic fishing float 1 according to the present invention receives RF signals sent from the transmitter 60 installed in the electronic fishing float 1, and converts them into data. The receiver 90 displays the data as sound, vibration, or light, which may be selected according to the user's convenience.

The sound in response to a fish's bite may be output through a speaker of the receiver or through an earphone.

In the reception of RF signals, weak bites and strong bites are distinguished by a wave form displayed on a monitor and sound, and thereby the probability of hooking the fish is improved.

The receiver 90 is controlled by a digital menu function of a monitor, volume of the earphone or button switches, and signals of the fish's bite are displayed as an equalizer form on the monitor.

When the receiver 90 according to the present invention is purchased, an angler has to register an intrinsic identification (ID) number. If the angler inputs a preferred password through a keypad, the inputted password is displayed after a voice announcement and, afterwards, the angler has to input the password in order to program or change the ID numbers, for the reason of security.

A registered user of the receiver 90 may register an ID number of the electronic fishing floats 1 without restriction to a place, and the ID number may be assigned to a RF transmitting module through the key pad, by using numbers, characters, or symbols.

Additionally, one to three electronic fishing floats having individual ID numbers may be registered with one receiver 90, and signals from each electronic fishing float are identified with the corresponding numbers in the receiver 90.

Besides displaying digital signals of the fish's bite or hooking, the receiver 90 according to the present invention also has functions of a MP3 player and FM/AM radio. Therefore, listening to music, news, weather information, or entertainment is possible.

The receiver 90 uses a rechargeable battery and a DC adaptor charger, and the battery may be used repeatedly. Therefore, environmental contamination due to used batteries may be prevented, and economical value may be improved through cost saving.

The receiver according to the present invention enables gathering information on map, fishing, and mountaineering by utilizing wireless internet. The receiver also provides information on country clubs and fairway holes in a golf course by using a content function, and putting distance or angle may be measured by a digital sensor. Additional components such as a sound recorder, storage media for digital photo album, digital camera, or electronic pocketbook may also be integrated into the receiver. Since configurations of the above components and functions are commonly used in the art, detailed explanation and drawings thereof are omitted in this disclosure.

Accordingly, in the fishing using a float according to the present invention, signals of a fish's bite or hooking sent by the electronic fishing float 1, namely, illumination of LED, or sound and vibration of a beeper are transmitted and displayed clearly. Therefore, even a beginner having less experience in fishing may pull a fishing rod at the correct time in response to a fish's bite or hooking.

In the field of fishing floats, buoyancy means a floating force, namely, force acting against the gravity. The buoyancy is indicated as <B>, <G>, <F>, <J> or numbers.

According to the sizes and shapes of a float, the floats are divided into a float for long distance and a float for short distance, or a float for high buoyancy and a float for low buoyancy. Additionally, selection and standard setting of a float differs according to the fishing environment such as visibility of a float, biting habit of a fish, depth of the water, velocity of flowing water, and concentration of salt in the water. Therefore, various floats should be purchased, and are replaced according to the situation of fishing.

The electronic fishing float 1 according to the present invention may be conveniently disassembled and replaced by disassembling the piston 50 from the fishing line brake through which the main fishing line L passes.

As shown in FIG. 9, when one angler uses a plurality of fishing rods, intrinsic numbers are assigned to each electronic fishing float, and signals of vibration or sound (such as various kinds of music) are output in response to a fish's bite or hooking. At the same time, the numbers assigned to each float are displayed on a monitor or a beeper. Therefore, each fishing rod is distinguished in a fishing condition using a plurality of fishing rods, and the hooking of a fish is easily identified even in heavy fog, cloud, and rain.

Additionally, an electronic fishing float 1 according to the present invention may include an underwater camera (not shown in the drawings) and a monitor connected by an electrical signal method, in order for an angler to see the actual situation of a fish's bite or hooking.

In the electronic fishing float according to the present invention, the total time required for transmitting signals of the fish's bite from the transmitter to the receiver and outputting digital signals as sound, vibration, or light is about 0.2 second.

The electronic fishing float may be used both for day and night fishing. The LED lamp illuminates continuously for 30 hours, and entanglement of fishing lines may be avoided. In particular, the life time of battery for the electronic fishing float is about 100 hours, and the illumination time may be extended by replacing a battery in the transmitter.

Various buoyancies according to the kinds of fishes are provided only with one electronic fishing float, and a coil spring made of materials such as stainless steel, or titanium, is assembled with a piston. Accordingly, setting of the electronic fishing float may be changed with more than ten variations. Therefore, the electronic fishing float may be effectively used both for freshwater fishing and sea fishing, and has advantages of high economical efficiency and reduction of environmental contamination and wastes.

As described above, by using an electronic transmitter and receiver according to the present invention, signals of a fish's bite or hooking are transmitted and output as illumination of LED, sound, vibration, or monitoring. Therefore, an angler can identify signals of the fish's bite or hooking without continuously watching a fishing float. Additionally, the angler may identify the signals of the fish's bite or hooking more clearly, and pull a fishing rod at a correct time. Accordingly, the probability of hooking a fish is improved and more fishes may be caught.

The present invention enables effective fishing by preventing the electronic fishing float from being carried away by flowing water, and thereby maintaining an angler's location at a predetermined position. Additionally, the receiver according to the present invention may provide geographical information such as fishing or mountaineering map, and various functions such as a sound recorder, storage media for digital photo album, digital camera. Therefore, everybody, regardless of age or sex, can enjoy a happy fishing leisure.

What is claimed is:
1. A multi-function electronic fishing float comprising:
a transmitter sending radio frequency signals of a fish's bite or hooking;
a receiver receiving and processing the radio frequency signals and showing information on the bite and hooking as sound, vibration, or light;
a main body having a platform formed with a step on its upper surface, accommodation holes formed in the platform along the inner circumference of the main body, a first screw and a second screw respectively formed on the outer circumferential surface of the top and bottom parts of the main body, a slip groove formed at the middle part of the body around the outer circumferential surface, and a female screw formed on the inner circumferential surface at the top of the main body;
an upper cap formed as a dome, and having a screw on its inner circumferential surface;
a lower cap formed as a cylinder and having a plurality of openings and rotating blades disposed radially at the same intervals on its outer circumferential surface, and a plurality of upper protrusions radially formed on its inner circumferential surface;
a locking cap having a handle on its upper surface and a male screw formed on its outer circumferential surface;
a piston formed with a predetermined height, having a magnet assembled in a stepped form and a connection hole formed at its lower part, and being inserted into a coil spring;
an upper watertight packing inserted between the main body and the upper cap;
a lower watertight packing fixed to the step;
a transmitter including a printed circuit board that has a battery, terminals, a first lead switch, a second lead switch, and a third lead switch, and being assembled with the platform;
a fishing line brake including a first cover and a second cover assembled together by a hooking method, a hole having a predetermined length and formed on its upper part, a spring and a fixing pin assembled together to provide repulsive force, a guide channel through which a main fishing line passes, a disc and a hinged shaft rotatively assembled in the guide channel, a rubber pad installed for braking the disk; and
a bottom cap.

2. The multi-function electronic fishing float of claim 1, further including connecting rods that protrudes vertically from the upper surface of the platform, and holes formed on the printed circuit board of the transmitter, allowing the connecting rods to be inserted therein.

3. The multi-function electronic fishing float of claim 1, further including a bottom cap assembled with the lowermost part of the main body.

4. The multi-function electronic fishing float of claim 1, further including a protrusion fitting groove formed on the inner circumferential surface of the bottom cap.

5. The multi-function electronic fishing float of claim 1, wherein the transmitter has functions of detecting signals of the fish's bite or hooking with the lead switches, applying the detected signals to a transmittance controller, illuminating a light emitting diode of an operating module, and sending the radio frequency signals through a radio frequency module.

* * * * *